Oct. 10, 1961 LE ROY V. OXLEY ET AL 3,003,694

PNEUMATIC APPARATUS FOR OPERATING BUSINESS MACHINES

Filed Aug. 14, 1957 10 Sheets-Sheet 1

INVENTORS
GERALD T. HAMMOND
BOYD N. CAGLE
LeROY V. OXLEY
CLARENCE M. BLYTHE
BY Thomas S. Ross
Albert W. Scribner
ATTORNEYS INVENTORS
GERALD T. HAMMOND
BOYD N. CAGLE
LeROY V. OXLEY
CLARENCE M. BLYTHE
BY Thomas S. Ross
Albert W. Scribner
ATTORNEYS Oct. 10, 1961 LE ROY V. OXLEY ET AL 3,003,694

PNEUMATIC APPARATUS FOR OPERATING BUSINESS MACHINES

Filed Aug. 14, 1957 10 Sheets-Sheet 3

INVENTORS

GERALD T. HAMMOND
BOYD N. CAGLE
Le ROY V. OXLEY
CLARENCE M. BLYTHE

BY Thomas S. Ross
Albert W. Scribner
ATTORNEYS

INVENTORS
GERALD T. HAMMOND
BOYD N. CAGLE
LeROY V. OXLEY
CLARENCE M. BLYTHE
BY Thomas S. Ross
Albert W. Scribner
ATTORNEYS INVENTORS
GERALD T. HAMMOND
BOYD N. CAGLE
LeROY V. OXLEY
CLARENCE M. BLYTHE
BY Thomas S. Ross
Albert W. Scribner
ATTORNEYS

PNEUMATIC APPARATUS FOR OPERATING BUSINESS MACHINES

Filed Aug. 14, 1957

10 Sheets-Sheet 6

INVENTORS

GERARD T. HAMMOND
BOYD N. CAGLE
Le ROY V. OXLEY
CLARENCE M. BLYTHE

BY Thomas S. Ross
Albert W. Scribner
ATTORNEYS

PNEUMATIC APPARATUS FOR OPERATING BUSINESS MACHINES

Filed Aug. 14, 1957 10 Sheets-Sheet 7

INVENTORS
GERALD T. HAMMOND
BOYD N. CAGLE
LeROY V. OXLEY
CLARENCE M. BLYTHE

BY Thomas S. Ross
Albert W. Scribner
ATTORNEYS

PNEUMATIC APPARATUS FOR OPERATING BUSINESS MACHINES

Filed Aug. 14, 1957

INVENTORS
GERALD T. HAMMOND
BOYD N. CAGLE
LeROY V. OXLEY
CLARENCE M. BLYTHE
BY Thomas S. Ross
Albert W. Scribner
ATTORNEYS Oct. 10, 1961 LE ROY V. OXLEY ET AL 3,003,694

PNEUMATIC APPARATUS FOR OPERATING BUSINESS MACHINES

Filed Aug. 14, 1957 10 Sheets-Sheet 9

INVENTORS

GERALD T. HAMMOND
BOYD N. CAGLE
Le ROY V. OXLEY
CLARENCE M. BLYTHE

BY

ATTORNEYS

INVENTORS

GERALD T. HAMMOND
BOYD N. CAGLE
LeROY V. OXLEY
CLARENCE M. BLYTHE

BY Thomas S. Ross
Albert W. Scribner
ATTORNEYS

United States Patent Office 3,003,694

Patented Oct. 10, 1961

3,003,694

PNEUMATIC APPARATUS FOR OPERATING BUSINESS MACHINES

Le Roy V. Oxley, Clarence M. Blythe, Gerald T. Hammond, and Boyd N. Cagle, Hendersonville, N.C., assignors to Robotyper Corporation, Hendersonville, N.C., a corporation of Michigan Filed Aug. 14, 1957, Ser. No. 678,148
25 Claims. (Cl. 235—146)

This invention relates to a novel apparatus for operating business machines and more particularly relates to a pneumatic device for controlling and operating an adding machine or the like.

In certain business establishments such as cafeterias and other self service type organizations the price listings, tax computing and price totalling operations for items purchased by each customer must be expedited in order to efficiently accommodate a large volume of business in a minimum amount of time. In addition to making price computations and records it is desirable to have a means for recording the number of each different item sold whereby a continuous inventory of goods sold may be maintained. The listing and totalling of item prices and the maintenance of inventory records may be carried out by one employee; however, this procedure has been found to be defective in that one person may not be able to quickly handle the volume of work presented at a given time, hence a delay in service to waiting customers may result. On the other hand if two or more employees are used to avoid such a time delay in carrying out the pricing and inventory operations, then the extra salaries involved will substantially increase the operating costs of the business.

One object of the instant invention is to provide a machine which may be easily operated by one person and which is capable of rapidly and simultaneously carrying out all the billing and inventory operations required in self service business establishments.

Another object of the invention is to provide a pneumatic means for automatically operating an adding machine in response to the selective actuation of a plurality of inventory counters.

Another object of the invention is to provide a novel pneumatic control system which is capable of being adjustably pre-set and actuated in accordance with the prices assigned to a series of items which are to be sold.

Another object of the invention is to provide a novel pneumatic circuit means for encoding and decoding the pressure impulses which represent the respective prices of the items sold.

A further object of the invention is to provide a pneumatic control circuit which will cause a sequential actuation of an amount key and a function control key of an adding machine in response to the initiation of a single pressure impulse.

Still another object of the invention is to provide an interlock control means for insuring that the adding machine associated with the instant aparatus is cycled only once for each actuation of an inventory control counter.

Another object of the invention is to provide a novel means for actuating an adding machine in response to pressure impulses which designate the price of an item sold.

Other objects will become apparent as the disclosure progresses.

Figure 1:
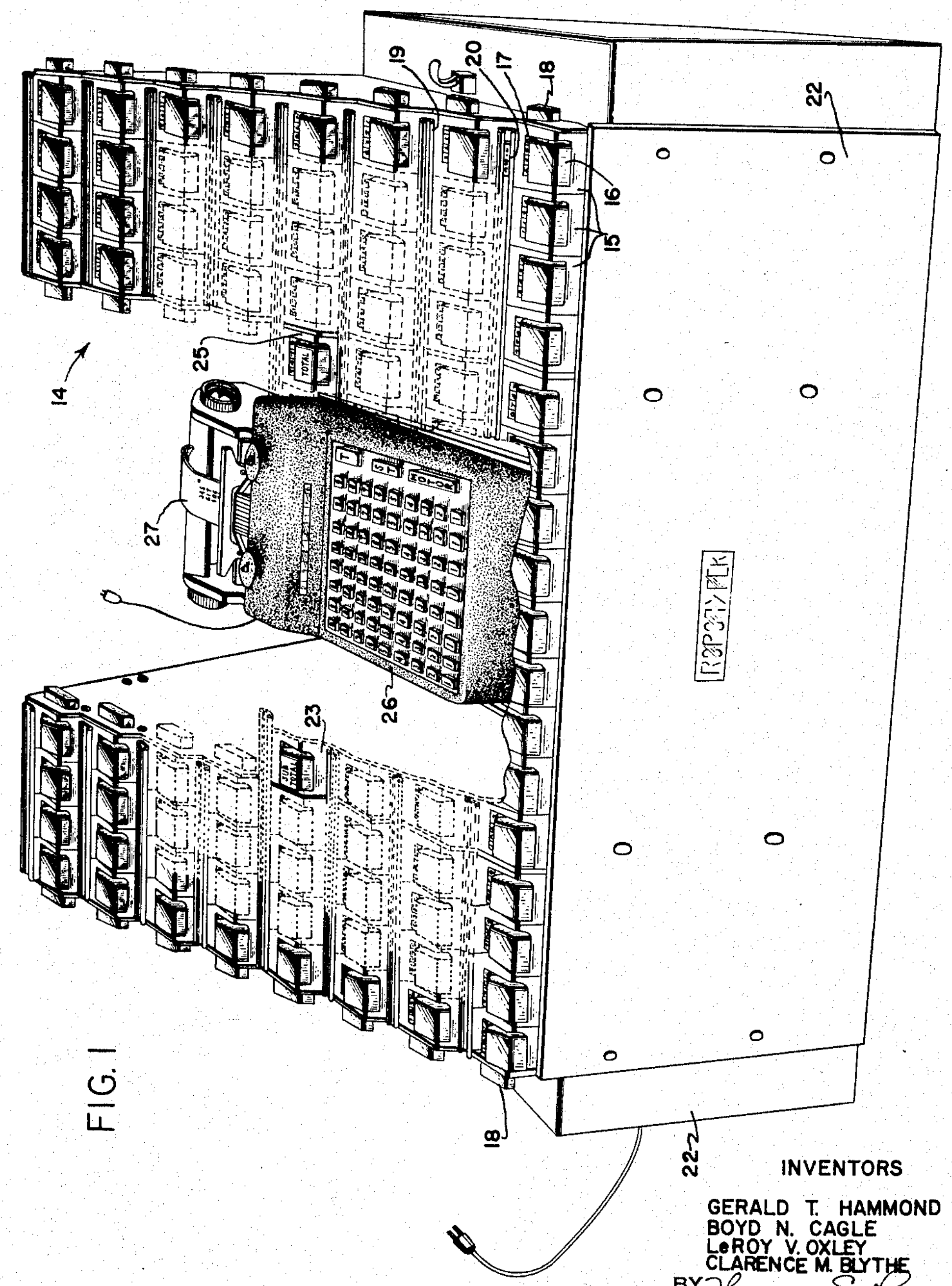
FIG. 1 is a perspective view showing the general arrangement of the instant machine.

FIGURES 17–20 collectively present the pneumatic circuit diagram for the instant machine.

The machine disclosed here is especially suited for use in a cafeteria where customers successively bring trays of prepared foods to a station where the selected dishes are checked for price, tax etc. and payment is made therefor. Although the hereinafter description of the instant invention will be made with reference to this particular business application, it will be understood that this constitutes only one of the many different commercial environments in which the instant machine may be efficiently utilized.

A general description of the instant apparatus will be made with reference to FIGURES 1 and 2. The machine is provided with an inclined keyboard 14 having a plurality of horizontal rows of item counters 15. These counters are conventional in construction and operation, each having an actuating button 16 and a series of numbered counting dials 17; said dials indicating the number of times that the respective actuating buttons 16 have been depressed. Each horizontal row of counters has associated therewith a reset lever 18 which is capable of resetting all the counters in the rows. This reset mechanism is conventional in nature and need not be particularized here. Above each row of counters there is provided an elongated open ended card holding member 19 into which cards or slips of paper 20 may be inserted. These slips of paper each have printed thereon the name of one of the various dishes which are offered for sale and each such card is positioned immediately above one of the respective counters 15 of the machine. Thus there is one counter 15 for each different item on the menu. The instant machine is provided with a subtotal counter 23, a plurality of tax counters 24 and a total counter 25 as shown in FIG. 2. The machine is also provided with an external housing 22, the various portions of which may be detachably secured by any suitable means to the machine frame.

As each customer presents his tray of purchases before the operator of the instant machine, the operator successively actuates the several counters 15 that correspond to the various items which the customer has selected whereby the counting dials of each of these counters will be advanced to the next higher number. Simultaneously, the prices of the items represented by the respective actuated counters will be automatically entered into a conventional type adding machine 26 shown in FIG. 1. After all the items in a given order have been thus entered in the adding machine, the subtotal counter 23 is actuated to cause the adding machine 26 to print a subtotal. After the operator of the machine has determined the tax to be applied to this subtotalled amount, she will then depress button 16 of the proper tax counter 24 whereby the proper tax amount will be automatically entered into the machine 26. Thereafter a total counter 25 is actuated to cause the adding machine to print a total thus indicating the total bill or amount due for a given group of items purchased. The operator may then tear off the printed portion 27 of the adding machine record tape and give it to the customer who will present the same together with the proper amount of money to a cashier.

It will be seen that a continuous inventory of the items sold is maintained by the dials of the various counters 15 and at the same time the adding machine 26 is automatically actuated in response to the actuation of said counters to thereby record the prices, tax and totals for the items purchased by each customer. Thus one employee may quickly and accurately control the pricing and inventory operations of the items sold.

Figure 2:
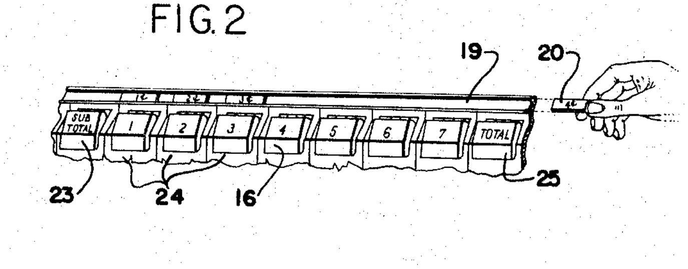
FIG. 2 is a detailed perspective view of one portion of the machine keyboard.
Figure 3:
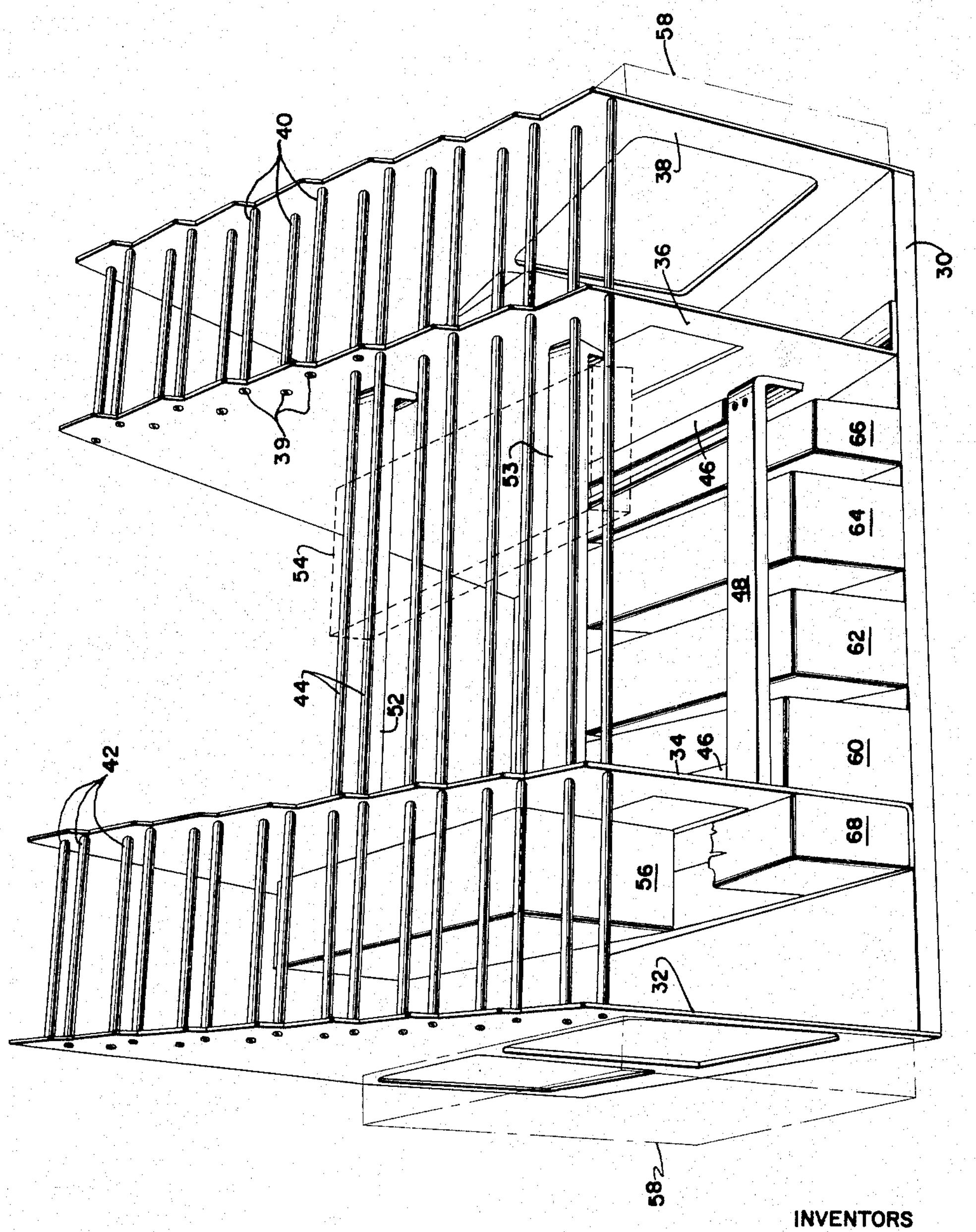
FIG. 3 is a perspective view showing the general frame structure of the machine.

The general frame construction of the instant machine is shown in FIG. 3. On the base plate 30 is fixedly mounted four vertically disposed, horizontally spaced frame plates 32, 34, 36 and 38. A plurality of spaced horizontal tie rods 40 are secured between the right hand pair of frame plates 36, 38 by means of screws 39. To the left hand pair of frame plates 32, 34 is secured a plurality of similar tie rods 42. A third group of spaced horizontal elongated tie rods 44 is secured along the upper forward portions of all four of said frame plates. The various counters 15, 23, 24, 25 and the card holding members 19 shown in FIGURES 1 and 2 are respectively mounted on and secured to the said tie rods 40, 42 and 44 by any suitable means.

Secured to the inner side of each of the frame plates 34 and 36 is a support bracket 46 the forward ends of which are interconnected by a cross member 48. Said brackets 46 and member 48 provide a support means for the adding machine 26, FIG. 1 which is to be used in conjunction with the instant apparatus. Also secured between said inner pair of frame plates is a pair of cross members 52 and 53 which support an actuator block assembly 54. Assembly 54 extends upwardly and rearwardly with respect to the machine base 30 so as to overlie the keyboard of said adding machine 26. Slidably mounted in said actuator assembly 54 is a plurality of air operated spring biased plungers, the selective actuation of which causes the various keys of the adding machine to be depressed. The structural details of assembly 54 will be discussed below.

There are several pneumatic control valve assemblies mounted on the machine frame. On the outside of each of the inner frame plates 34 and 36 there is secured a secondary valve assembly 56. On the outside of each of the outer pair of frame plates 32 and 38 is secured a pricing valve assembly 58 as shown by the phantom lines in FIG. 3. Four valve assemblies are mounted on the base plate 30, to wit: a primary-secondary valve assembly 60, two decoding valve assemblies 62, 64 and an interlock valve assembly 66. To the outer side of frame plate 34 is secured the secondary valve assembly 68.

Figure 4:
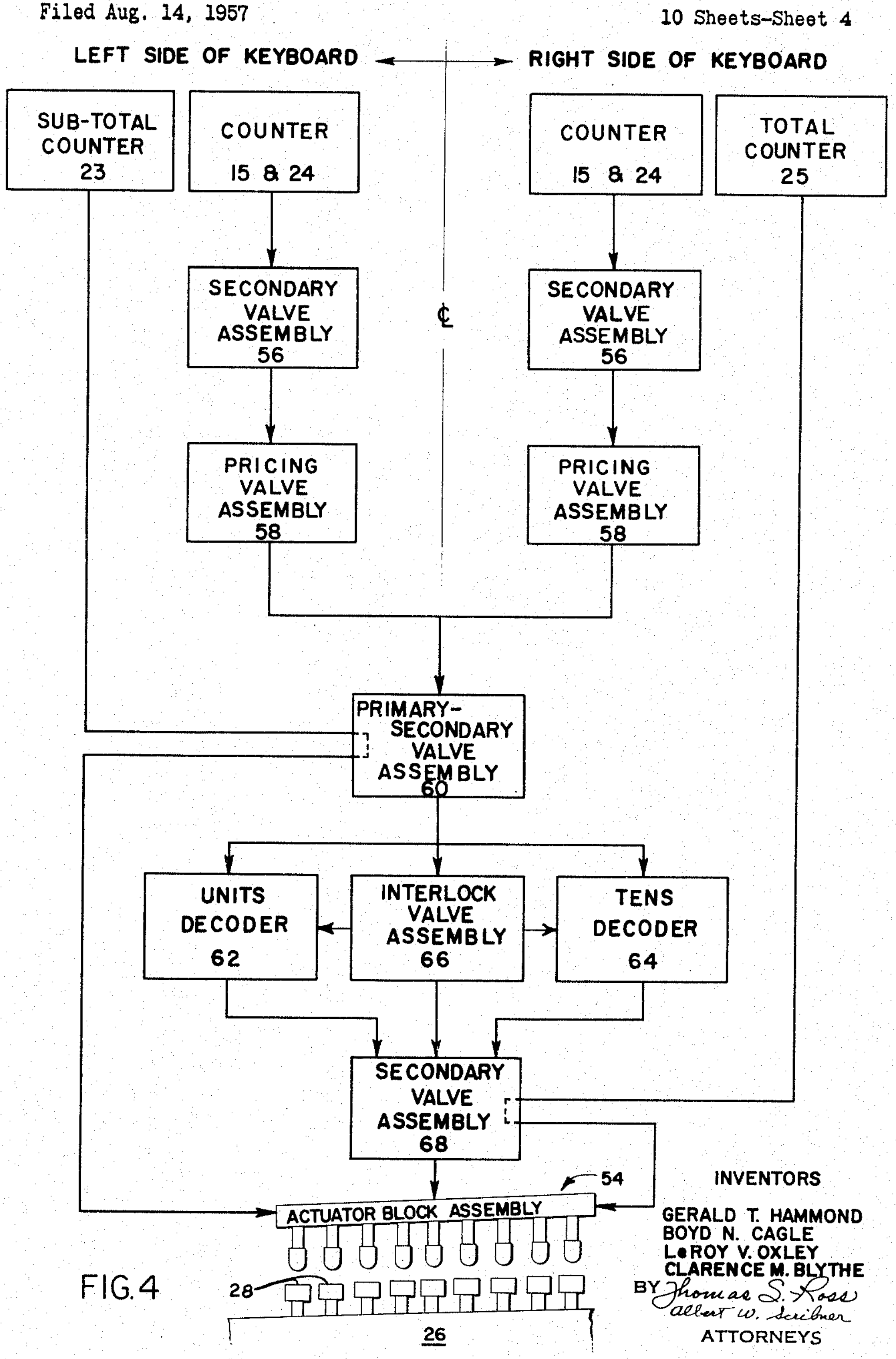
FIG. 4 is a block diagram showing the general interconnection between the major control valve assemblies.

FIG. 4 shows a block diagram which indicates the general order of interconnection between these various above mentioned control valve assemblies. All of the counters 15 and 24 on the left hand half of the machine keyboard are interconnected with the secondary and pricing valve assemblies 56 and 58 respectively mounted on the left hand pair of frame plates 32 and 34. Similarly all the counters 15 and 24 on the right hand half of the machine keyboard are interconnected with the secondary and pricing valve assemblies 56 and 58 mounted on the right hand pair of frame plates 36 and 38. Both of the pricing valve units 58 are connected to and control the primary-secondary valve unit 60. Actuation of any one of the counters 15 or 24 will initiate a pressure impulse which is transmitted to one of said secondary valve assemblies 56. The associated pricing valve assembly 58 receiving pressure impulses from said assembly 56 will initiate a plurality of coded pressure impulses which are received by the primary-secondary valve assembly 60. From assembly 60 pressure impulses pass to either or both of the pair of decoding valve assemblies 62, 64 and/or to the interlock valve assembly 66. From these latter three assemblies pressure impulses are transmitted to the secondary valve assembly 68. The pressure impulses initiated by the last mentioned assembly control the operation of said actuator block assembly 54 which in turn selectively depress the appropriate amount and/or function control keys 28 of the adding machine 26. When the subtotal counter 23 is actuated a pressure impulse is transmitted through the primary-secondary valve unit 60 to the actuating block assembly 54; similarly when the total counter 25 is actuated a pressure impulse is transmitted through the secondary valve unit 68 to said actuating assembly 54 whereby the subtotal and total keys of adding machine 26 are respectively actuated.

Figure 5:
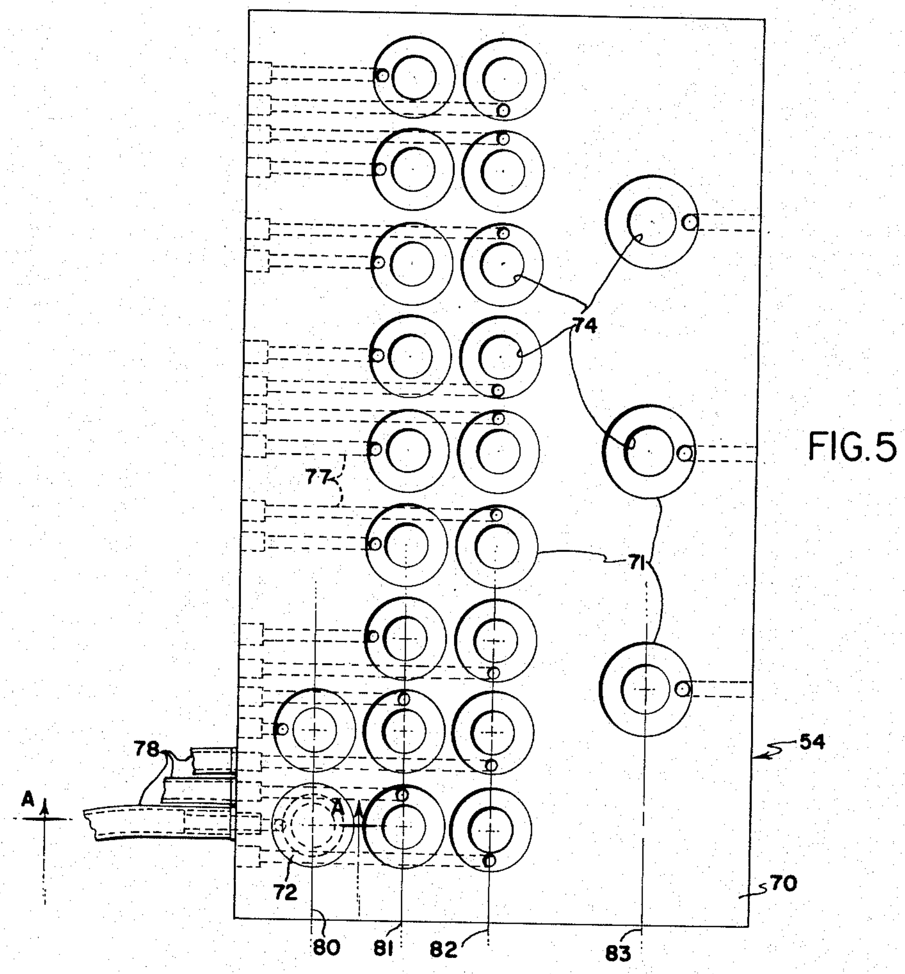
FIG. 5 is a plan view of the actuator block assembly.
Figure 6:
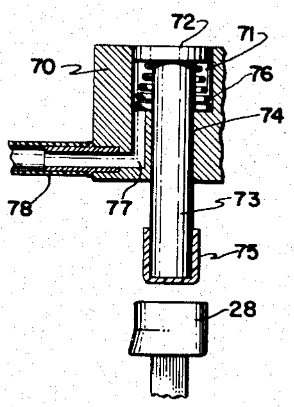
FIG. 6 is a detailed sectional view of a portion of the actuator block assembly taken along section line A—A of FIG. 5.

The above mentioned actuator block assembly 54 comprises a body member 70, FIGS. 5 and 6, in the upper portion of which is formed a plurality of cylindrical recesses 71. Slidably mounted in each of said recesses 71 is a plunger 72 having secured thereto an actuating stem 73, FIG. 6, which extends through an aperture 74 formed through the lower part of body 70. A resilient pad member 75 is secured to the lower end of each of said stems 73. A coil spring 76 is operatively disposed between the bottom of each of said recesses 71 and the respective associated plungers 72 so that said actuating stems 73 are normally biased to their respective upper inactive positions as shown in FIG. 6. Any suitable means may be used to define an upward limit of travel for the plungers 72 in their respective recesses 71. A plurality of bores 77 are formed in the body member 70 so as to pneumatically interconnect each of said recesses 71 with one of the respective control lines 78. An atmospheric pressure normally exists in lines 78, bores 77 and recesses 71, hence when a sub-atmospheric pressure impulse is transmitted into any one of said recesses the associated plunger 72 and stem 73 will be moved downwardly against the action of spring 76 by the atmospheric pressure acting on the top of plunger 72 to thereby depress one of the keys 28 of said adding machine 26. When the sub-atmospheric pressure impulse is terminated, spring 76 will restore and maintain the plunger 72 in its normal elevated position shown in FIG. 6.

The pattern of distribution of the recesses 71 in the body member 70, as seen in FIG. 5, will correspond to the pattern of distribution of the keys of the particular adding machine which is used with the instant apparatus. The columns 80, 81 and 82 of recesses 71 correspond respectively to the columns of dollars, tens and units order keys of the adding machine, while the column 83 of recesses 71 correspond to the column of function control keys of said adding machine. The upper, middle, and lower recesses 71 in said column 83 of FIG. 5 correspond to the total, subtotal and motor bar keys of said adding machine 26.

Referring now more particularly to FIGS. 7–10, the various valves utilized in connection with this invention will be seen. It is necessary, to fully understand the operation of this device, to be thoroughly versed in the operation of these various valves and, therefore, this description will first be directed to their natures and functions.

The valve illustrated somewhat diagrammatically in

Figure 7:
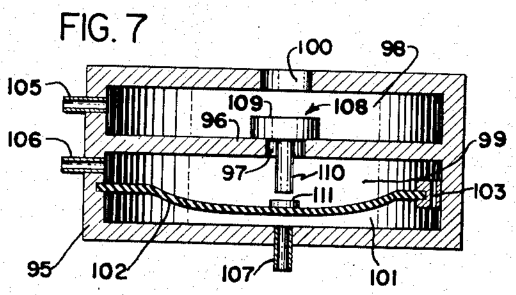
FIGURES 7–10 are cross sectional views of the secondary, primary, blocking and impulse type valves, respectively, which are used in the instant pneumatic circuitry.

FIG. 7 is of the type which will hereinafter be referred to as a secondary valve. Describing first the structural characteristics of the secondary valve there is provided a valve body 95 having an internal partition wall 96 that is formed with an aperture 97 which pneumatically interconnects the upper chamber 98 with the intermediate chamber 99. The upper most wall of the body 95 is provided with an aperture 100. A lower chamber 101 is provided in the body 95 by securing the periphery of the flexible diaphragm 102 to the vertical walls of said body. A restricted bleed passage 103 is provided as shown in order to pneumatically interconnect said intermediate and lower chambers 99 and 101. Pressure conduit lines 105, 106 and 107 respectively communicate with the chambers 98, 99 and 101. A movable valve member 108 having head and stem portions 109 and 110 respectively is adapted to cooperate with the aperture 97 or the aperture 100 in a manner described below. The contact pad 111 secured to the upper side of the flexible diaphragm 102 is adapted to engage the lower end of said stem 110 and lift said valve member 108 when diaphragm 102 is flexed upwardly.

In operation, the secondary valve of FIG. 7 is connected to a sub-atmospheric pressure source through the line 106 where by a reduced pressure will normally exist in the pneumatically interconnected chambers 99 and 101. Chamber 98 will be open to the atmosphere through aperture 100. Under these normal pressure conditions the head 109 of valve member 108 will be held in engagement with the upper surface of partition wall 96 so that said head will overlie and pneumatically block the aperture 97. Valve member 108 is maintained in this position by reason of the differential pressure existing on either side of said head, the pressure in chamber 99 being sub-atmospheric and the pressure in chamber 98 being atmospheric. It will be apparent that the pressure in the valve output line 105 is normally atmospheric and that the pressure in the valve control line 107 is normally sub-atmospheric.

The valve is operated by initiating an atmospheric pressure impulse in the control line 107. This impulse will increase the pressure below the diaphragm 102 and before the pressure in chamber 99 is increased by air flow through the restricted bleed passage 103 the resultant pressure differential acting on the opposite sides of said diaphragm will cause the latter to be flexed upwardly thereby lifting and holding the valve member 108 in an elevated position wherein said head 109 overlies and pneumatically blocks the aperture 100. In this actuated condition of the valve, chamber 98 will be pneumatically connected through aperture 97 to said sub-atmospheric pressure source acting through line 106 whereby a sub-atmospheric pressure impulse will be initiated in the valve output line 105.

When the atmospheric pressure impulse in the control line 107 is terminated the pressure in the chamber 101 and in the line 107 will be restored to the normally sub-atmospheric level by the action of said source. When this occurs the valve member 108 and diaphragm 102 will be moved downwardly under the action of the pressure differential existing on the upper and lower surfaces of head 109 of valve member 108. The pressure in chamber 98 thus becoming atmospheric and hence greater than that in chamber 99 will cause said valve member 108 to be seated and held over the aperture 97 as shown in FIG. 7. At the same time the pressure in said output line 105 will be restored to the normal atmospheric level.

It will be understood that the showing in FIG. 7 is for the purpose of illustration only and is not to be taken as setting forth the exact constructional details or dimensions of the secondary valve.

Figure 8:
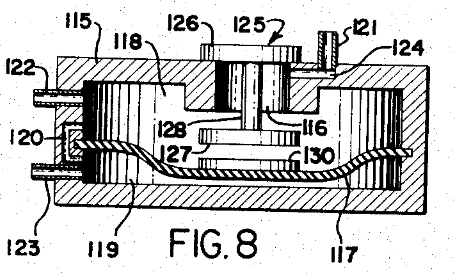

Referring to FIG. 8 there is diagrammatically shown a valve which will be hereinafter referred to as a primary valve. Describing first the structural characteristics of the valve there is provided a valve body 115 having an aperture 116 formed in the upper wall thereof. The interior of said valve body 115 is partitioned by means of a flexible diaphragm 117 thus providing an upper and a lower chamber 118 and 119 respectively, said chambers being pneumatically interconnected by means of a restricted bleed passage 120. Three pressure conduit lines 121, 122 and 123 are connected to the primary valve. Line 121 pneumatically communicates with the upper chamber 118 through the passage 124 and said aperture 116, while lines 122 and 123 pneumatically communicate directly with the upper and lower chambers 118 and 119, respectively. A valve member 125 is operatively disposed in the said aperture 116 of the valve body, said member having upper and lower head portions 126 and 127 respectively and an interconnecting stem portion 128. A contact pad 130 is secured to the upper surface of the flexible diaphragm 117 in a position beneath the lower head portion 127 of said valve member.

In operation, the primary valve of FIG. 8 is connected to a sub-atmospheric pressure source through line 122 whereby a reduced pressure will normally exist in said pneumatically interconnected chambers 118 and 119. Under these pressure conditions the atmospheric pressure acting above the upper valve head 126 will retain the valve member 125 in its lower operative position shown in FIG. 8 wherein said head portion 126 overlies and pneumatically blocks the upper end of aperture 116 and wherein the valve output line 121 is pneumatically connected with said upper chamber 118. In that the pressure in said chambers 118 and 119 is normally sub-atmospheric, it will be apparent the pressure in the valve control and output lines 123 and 121 respectively is normally sub-atmospheric.

The valve is operated by initiating an atmospheric pressure impulse in the valve control line 123. This impulse will increase the pressure in chamber 119 and before the pressure in chamber 118 is also increased by air flow through the restricted passage 120 the differential pressure acting on the opposite sides of the diaphragm 117 will cause the latter to be flexed upwardly thereby lifting and holding the valve member 125 in an upper operative position wherein the lower head portion 127 thereof overlies and pneumatically blocks the lower end of said aperture 116. In this actuated condition of the valve the upper end of the aperture 116 will be open to the atmosphere and hence an atmospheric pressure impulse will be initiated in said passage 124 and in the valve output line 121.

When the atmospheric pressure impulse in the control line 123 is terminated the pressure in chamber 119 will be restored to the normal sub-atmospheric level by the action of said source. When this occurs the valve member 125 and the diaphragm 117 will be moved downwardly under the action of the differential pressure existing on the upper and lower sides of said valve head portion 127 and will be thereby restored and held in their normal lower positions shown in FIG. 8. Thus the valve output line 121 is again pneumatically connected to the chamber 118 and hence the pressure in said output line will be reduced to the normal sub-atmospheric level.

Figure 9:
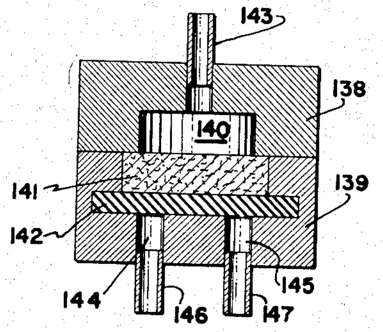

The valve which is shown in FIG. 9 and which will hereinafter be referred to as a blocking valve comprises a pair of recessed valve body portions 138 and 139 which cooperatively define an air chamber 140. Mounted in juxtaposition at the lower end of said chamber is a flexible pad member 141 and a flexible diaphragm 142. Air chamber 140 pneumatically communicates with the control pressure conduit line 143. The apertures 144 and 145 formed in the lower wall of the valve body portion 139 respectively communicate with the valve flow lines 146 and 147. When the pressure in control line 143 and chamber 140 is atmospheric the flexible diaphragm will remain in the position shown in FIG. 9 thereby overlying the respective inner ends of said apertures 144 and 145 and preventing the pneumatic connection of flow lines 146 and 147. When the pressure in said line 143 and chamber 140 is sub-atmospheric, the diaphragm 142 will be flexed upwardly to thereby uncover the respective inner ends of said apertures and pneumatically interconnect said flow lines 146 and 147.

It is important to note that the primary, secondary and blocking valves operate only momentarily and during such time as an impulse is admitted to the actuated chambers thereof. As soon as the impulse or series of impulses are terminated, the valves will automatically reset to their normal positions.

Figure 10:
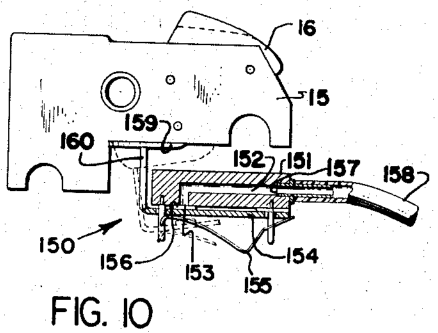

Referring to FIG. 10 there is shown an impulse valve 150 comprising a valve body 151 having a passage 152 formed therethrough. One end 153 of said passage is normally closed by means of the actuating arm 154 which is pivotally mounted at its right hand end to said valve body 151 by any suitable means. A leaf spring 155 normally biases said arm in a clockwise direction whereby the piece of leather 156 or similar material secured to the inner side of said arm 154 overlies said end 153 of passage 152. The other end 157 of passage 152 communicates with the pressure line 158.

A plurality of such impulse valves 150 are secured to the machine by any suitable means so that each thereof is positioned immediately beneath one of the respective counters 15, 23, 24 and 25. The pivoted button lever 159 comprising a part of the standard counter 15, FIG. 10, normally overlies an upturned extension 160 of the valve actuating arm 154. When the button 16 of said counter is depressed said lever 159 is pivoted downwardly to thereby engage and move said actuating arm 154 away from the end 153 of said passageway 152 as shown by the dotted lines of FIG. 10. It will be apparent that when extension 160 of arm 154 is so depressed so as to uncover the end 153 of said passage 152 an atmospheric pressure impulse will be initiated in the said line 158.

Figure 11:
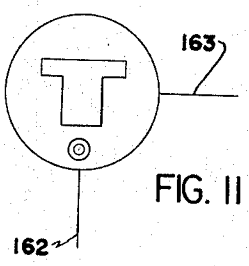
FIGURES 11–15 are diagrammatic views showing the symbols used to designate the various types of valves in the circuit diagram of FIGURES 17–20.

The symbols for the secondary, primary, blocking and impulse valves are shown in FIGS. 11, 12, 13 and 14 respectively. In FIG. 11 the secondary valve control and output lines are shown at 162 and 163 respectively. The pressure in line 162 is normally sub-atmospheric and the pressure in line 163 is normally atmospheric. When an atmospheric pressure impulse is transmitted through the control line 162, a sub-atmospheric pressure impulse will be initiated in said output line 163.

Figure 12:
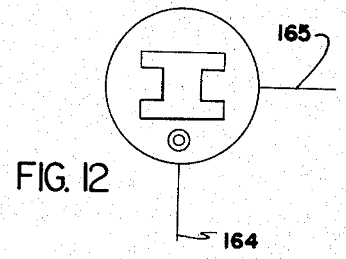

In FIG. 12 the primary valve control and output lines are shown at 164 and 165 respectively. The pressure in control line 164 and the output line 165 is normally sub-atmospheric. When the valve receives an atmospheric pressure impulse through line 164, an atmospheric pressure impulse will be initiated in said line 165.

Figure 13:
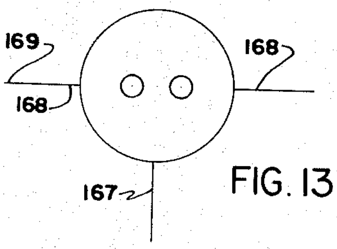

In FIG. 13 the blocking valve control and flow lines are shown at 167 and 168 respectively. If the pressure in control line 167 is normally sub-atmospheric then the blocking valves will be normally open. Conversely if the pressure in line 167 is normally atmospheric then the valve will be normally closed. Unless otherwise indicated, one end 169 of said flow line is open to atmospheric pressure conditions.

Figure 14:
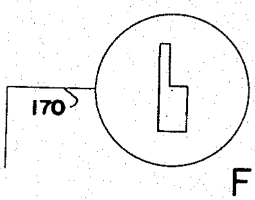

In FIG. 14 the pressure in the output line 170 of the impulse valve is normally sub-atmospheric, hence when said valve is operated an atmospheric pressure impulse will be initiated in said line 170.

Figure 15:
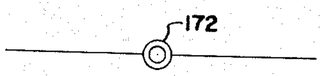
Figure 17:
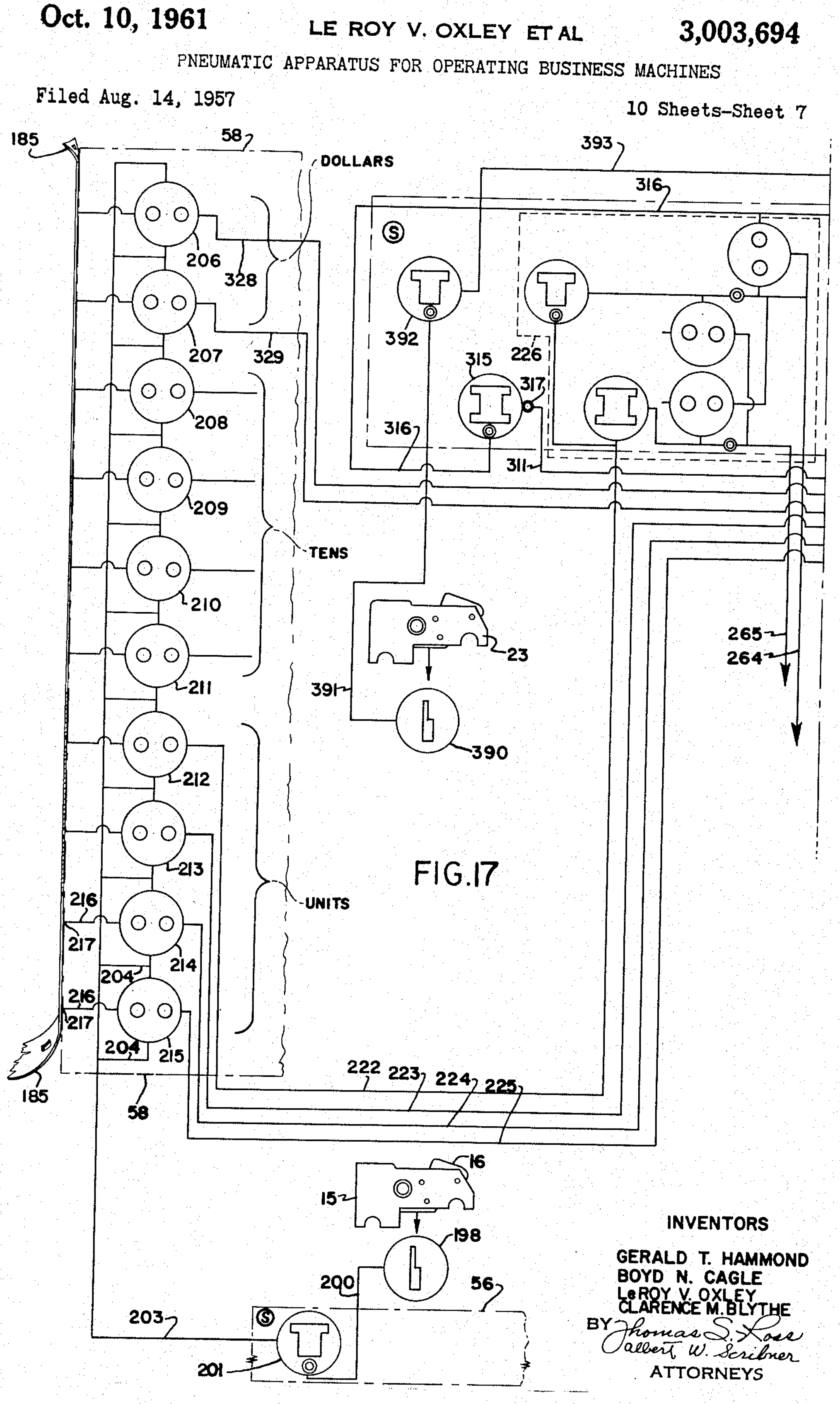
Figure 18:
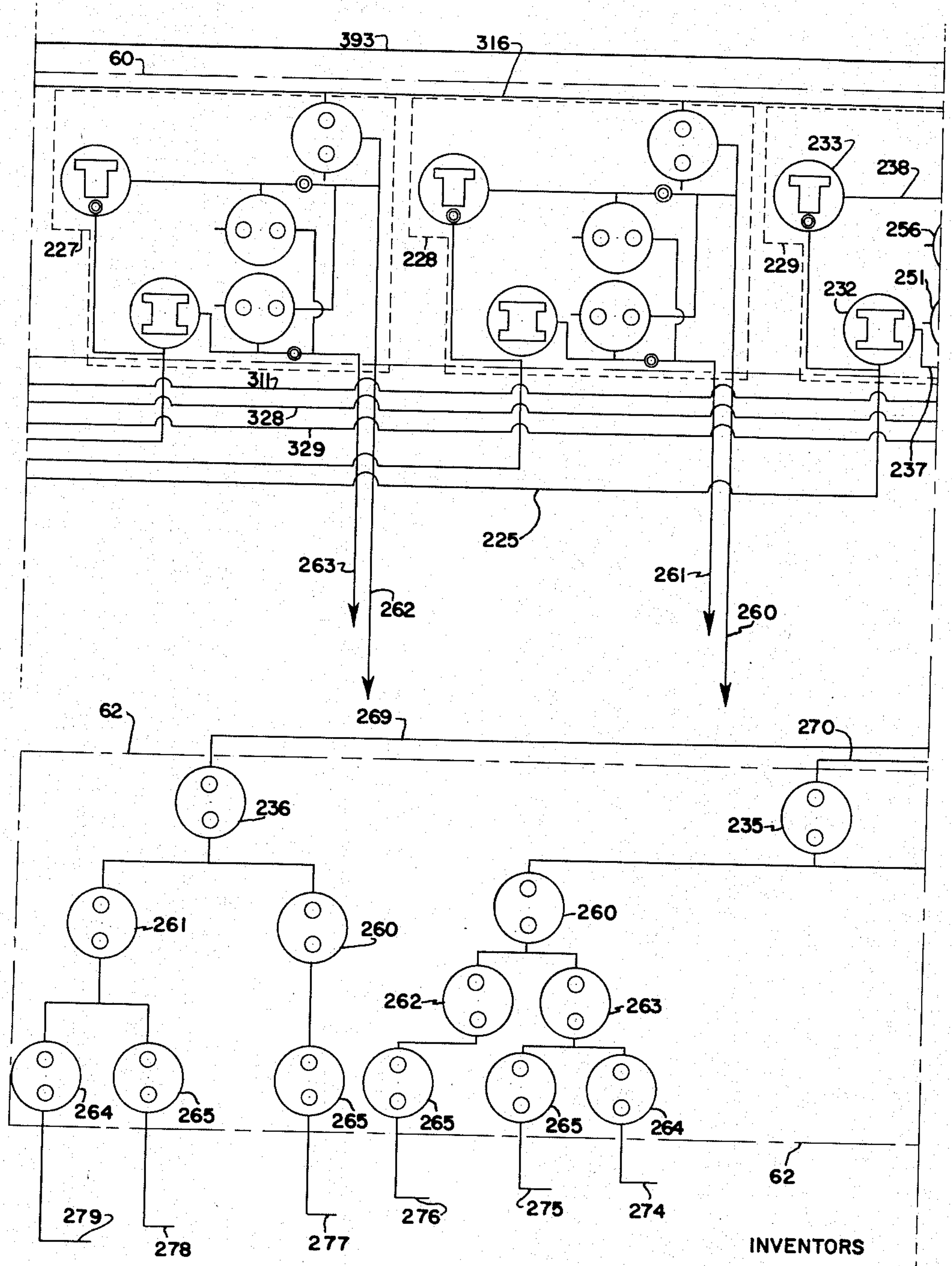
Figure 19:
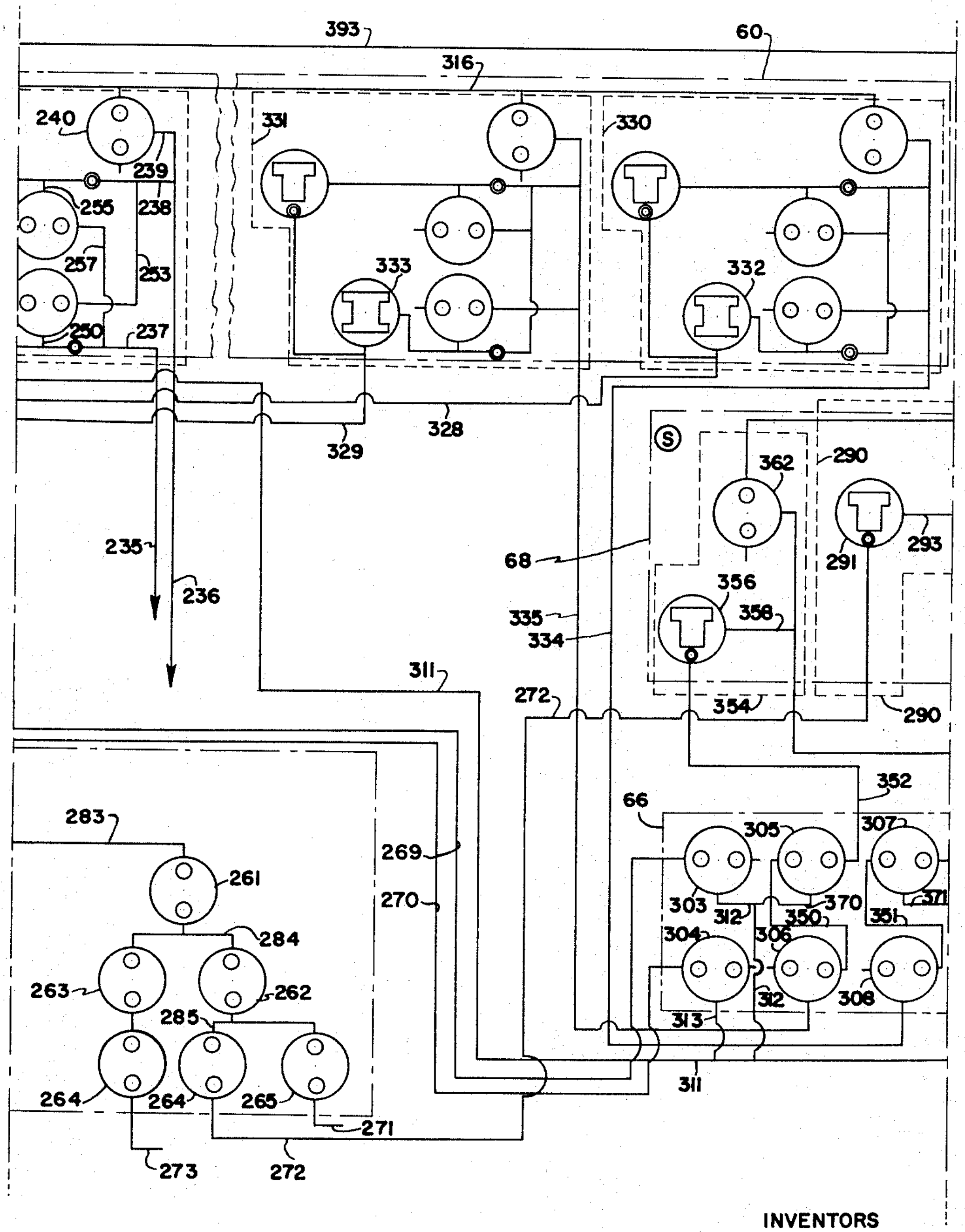

FIG. 15 shows the symbol 172 for a conventional type restriction or "bleeder" which is interposed in several of the control lines shown in the circuit diagram of FIGS. 17–19.

It is to be understood that the various valves utilized in this invention are constructed in accordance with the principles set forth in application Serial Number 467,354, filed November 8, 1954, S.N. 510,791, filed May 24, 1955; S.N. 528,687, filed August 15, 1955, and S.N. 603,717, filed August 13, 1956, now Patent Nos. 2,947,320, 2,967,600, 2,916,128, and 2,958,567, respectively. In this connection, it is to be appreciated that the various valve assemblies which constitute complete entities in and of themselves are preferably constructed quite similarly to the structure embodied in application S.N. 467,354, above mentioned, and wherein the various types of valves can be accommodated in the various individual assemblies by virtue of the manner in which the laminations are related and stacked upon each other, as is clearly set forth in such application.

Figure 16:
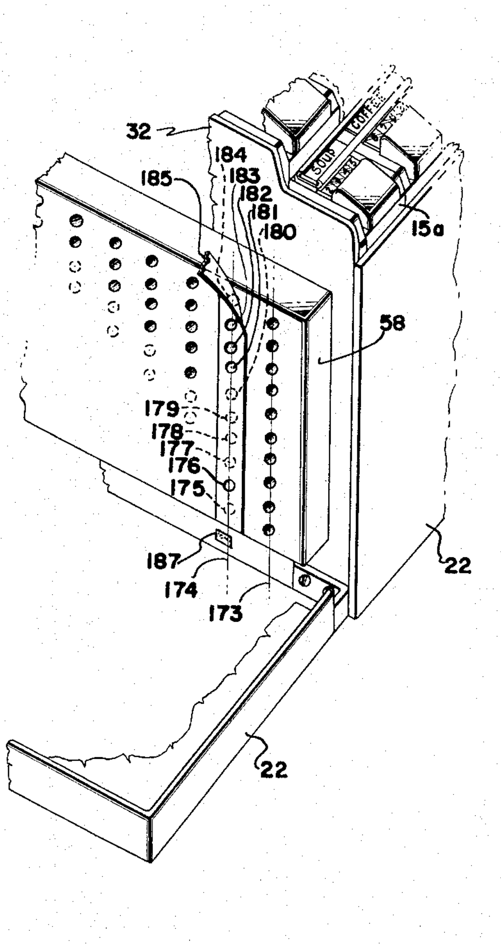
FIG. 16 is a detailed perspective view of a portion of one of the pricing valve assemblies.

A portion of the pricing valve assembly 58 which is mounted on the left hand side frame plate 32 is shown in FIG. 16. This valve assembly is controlled by the various counters 15 and 24 located on the left hand side of the machine keyboard 14. A plurality of columns 173 and 174 etc. of holes are formed in the side wall of said valve assembly 58. Each such column of holes is functionally interrelated with a different one of said counters 15 and 24. In that the function of and the interconnection between each of said columns of holes and the respective associated counters 15 and 24 are similar, an explanation and discussion of one of said columns, 174, and its related counter **15*a*, FIG. 16, will suffice here. The ten holes or ports 175 through 184 in the vertical column 174 are provided so as to permit a pneumatic coding of the price of the item represented by said counter 15*a*. Here a strip 185 of perforated record tape or like material is placed over all of the holes 175–184 and said tape is then punched coincident with one or more of said holes 175–184 in accordance with a particular code pattern thereby leaving certain of said ports open to atmospheric pressure conditions. The lower four ports 175–178 are utilized for coding the units digit of said item price while the next four ports 179–182 are used to code the tens digit of said price. The upper two ports 183 and 184 are used to respectively designate a value of either one or two in the dollars order of said price. It will be assumed that none of the items which are offered for sale are priced over $2.99 hence only two ports 183 and 184** need be provided for accommodating the dollars order digit of an item price.

Each of the columns of ports such as 174 may be numbered or otherwise designated as shown at 187 so as to identify the counters with which the respective columns are associated.

The four level code used here for designating any digit 1 through 9 of either the tens or units order of the item price is as follows:

*Table A*

| Digit: | Code |
|---|---|
| 1 | 1 |
| 2 | 2 |
| 3 | 3 |
| 4 | 4 |
| 5 | 1 and 2 |
| 6 | 2 and 4 |
| 7 | 2 and 3 |
| 8 | 1 and 4 |
| 9 | 3 and 4 |

Applying this code to the units order ports 175–178 of the pricing valve assembly 58, an amount from 1 to 9 cents may be coded by punching said tape coincident with one or more of the ports 175–178 as follows:

*Table B*

| Cents digit: | Ports open to atmosphere |
|---|---|
| 1 | **175** |
| 2 | **176** |
| 3 | **177** |
| 4 | **178** |
| 5 | **175** and **176** |
| 6 | **176** and **178** |
| 7 | **176** and **177** |
| 8 | **175** and **178** |
| 9 | **177** and **178** |

Similarly an amount from 1 to 9 in the tens order of the item price may be coded by punching the tape coincident with one or more of the ports 179–182 as follows:

*Table C*

| "Tens" digits: | Ports open to atmosphere |
|---|---|
| 1 | 179 |
| 2 | 180 |
| 3 | 181 |
| 4 | 182 |
| 5 | 179 and 180 |
| 6 | 180 and 182 |
| 7 | 180 and 181 |
| 8 | 179 and 182 |
| 9 | 181 and 182 |

No holes are punched in said tape where a zero appears in either the tens or units order of said item price, the adding machine 26 being constructed such that a zero is printed when none of the amount keys in these two orders are depressed.

As an example, if the price of the item represented by said counter 15*a*, FIG. 16, is $1.92 then said tape would be punched coincident with the ports 183; 182, 181; and 176 as shown in FIG. 16.

The seven columns of ports in the pricing valve assembly 58 corresponding to the seven tax amount counters 24, FIG. 2, are coded so as to represent a tax amount of 1, 2, 3, 4, 5, 6 and 7 cents respectively.

FIGURES 17, 18, 19 and 20 collectively define the circuit diagram for the instant pneumatic control apparatus. In that the circuitry associated with each of the items and tax counters 15 and 24, is the same, explanation of one thereof will suffice here. The various major valve assemblies 56, 58, 60, 62, 64, 66, 68 and 54 described above in connection with FIGS. 3 and 4 are shown in FIGS. 17–20 as rectangles defined by lines in phantom. The symbol S when appearing in the upper left hand corner of any of said rectangles indicates that that particular valve assembly is suitably connected to the usual type vacuum or sub-atmospheric pressure source in a manner well understood in the art.

Item counter 15, FIG. 17, actuates the impulse valve 198 in a manner similar to that described in connection with FIG. 10. Valve 198 is connected through line 200 to one of the secondary valves 201 of valve assembly 56. The line 203 from said secondary valve 201 is connected through a plurality of lines 204 so as to control each of the 10 vertically aligned normally closed blocking valves 206 through 215 of the pricing valve assembly 58. When a sub-atmospheric pressure impulse is initiated in said line 203 by operation of said valve 201 all ten of the blocking valves 206–215 will be simultaneously opened. A flow line 216 from each of these ten blocking valves respectively communicates with one of ten vertically aligned inlet ports 217 of valve assembly 58. This column of ports 217 is identical to the column 174 of ports described above in connection with FIG. 16. The tape 185, FIG. 17, covering the various inlet ports 217 corresponds to the tape 185 shown in FIG. 16.

The circuitry to be controlled by the four blocking valves 208 through 211 related to the tens order of the item price is identical to that for the four blocking valves 212 through 215 related to the units order of the item price; hence, a circuit diagram and description for that of the latter only will suffice here.

Blocking valves 212–215 are respectively connected by flow lines 222–225 so as to actuate the four primary-secondary valves units 226–229 respectively of the primary-secondary valve assembly 60. Said units 226–229 are enclosed in dotted lines rectangles in the circuit diagram. In that said primary-secondary valve units 226–229 are structurally and functionally similar, explanation of one thereof, 229, will suffice here.

Said line 225 is connected to the primary-secondary valve unit 229 so as to control both the primary valve 232, and the secondary valve 233. The two output lines 235 and 236 of said valve unit 229 are connected to said valves 232 and 233 through lines 237 and 238 respectively. Said line 236 is also connected through line 239 so as to control the blocking valve 240. A line 250 from said line 237 controls the blocking valve 251 which is connected to said line 238 through line 253. Likewise a line 255 from said line 238 controls the blocking valve 256 which is connected to said line 237 through line 257.

Each primary-secondary valve unit 226–229 etc. constitutes a "flip-flop" circuit; i.e. considering said valve unit 229, atmospheric pressure normally exists in the output line 236 while a sub-atmospheric pressure normally exists in the output line 235. These conditions are reversed when the valve unit 229 receives an atmospheric pressure impulse through said line 225 and are restored to normal when said pressure impulses are terminated. The purpose for including the two blocking valves 251 and 256 in the valve unit 229 is to control the rate of pressure change in the respective output lines 235 and 236 when said valve unit 229 is actuated. Specifically said blocking valves when interposed in the circuit in the manner shown, will cause a lowering of the pressure in said output lines 235 and 236 to occur at a relatively slow rate; and will cause an increasing of the pressure in said output lines to occur at a relatively rapid rate. These characteristics of operation of each of the valve units 226–229 etc. are desirable for the efficient functioning of the decoding valve assembly 62 to be described below.

Each of the output lines 235, 236; 260, 261; 262, 263; and 264, 265 from the primary-secondary valve units 229, 228, 227, and 226 respectively are connected so as to control one or more of the nineteen blocking valves of the units decoding valve assembly 62. These blocking valves are functionally interconnected in series and/or parallel relation in the pattern shown in FIGS. 18 and 19. Said nineteen blocking valves are numbered so as to correspond to the numbers of the control lines to which they are respectively connected; for example, all the blocking valves numbered 264 are controlled by impulses from said output line 264 of the primary-secondary valve unit 226. Similarly, all the blocking valves numbered 263 are controlled by impulses from the said output line 263 of valve unit 227. It will be noted that all the even numbered blocking valves of the decoding valve assembly 62 are controlled by the respective secondary valves of the primary-secondary valve units 226–229, hence these even numbered blocking valves will be normally closed. The odd numbered blocking valves of the decoding assembly 62 are respectively controlled by the respective primary valves of said units 226–229, hence these odd numbered blocking valves will be normally open. The selective actuation of various combinations of blocking valves 235, 236, 260, etc. in accordance with the code pattern described in Table B above will, at any one time, permit air to flow into the decoding assembly 62 through either of the two inlet lines 269 and 270 and out through one, and only one, of the nine output lines 271 through 279. The nine output lines 271 through 279 of the units decoding valve assembly 62 correspond to the units digits 3, 9, 4, 6, 2, 7, 5, 1 and 8 respectively of an item price. Each of these nine output lines of the decoding valve assembly 62 will control the operation of one of the nine units order keys of the adding machine 26.

The nine output lines 271–279 from the units decoding valve assembly 62 each control identical operating circuits hence a discussion of one thereof will suffice here. Line 272 is connected so as to control a secondary valve unit 290, FIGS. 19 and 20, in the said secondary valve assembly 68. Said valve unit 290 is enclosed in dotted lines in the circuit diagram. The secondary valve 291 of said unit 290 controls the blocking valve 292 through line 293. Said secondary valve 291 is also connected through line 295 so as to actuate the spring biased plunger 296 of said actuator block assembly 54. The plunger 296 will thus depress that unit order key of the adding machine 26 which corresponds to the particular decoder output line 271–279 in which an atmospheric pressure impulse has been initiated. The blocking valve 292 of said secondary valve unit 290 is connected to a common line 297, FIG. 20, which controls a secondary valve 298. The line 297 is similarly connected to each of the other valve units which correspond to said unit 290. Valve 298 is connected through line 299 so as to actuate the plunger MB of said actuator block assembly 54. Plunger MB being disposed above the motor bar key of adding machine 26 will depress said key whenever said valve 298 is actuated. Although the operation of both of said plungers 296 and MB are controlled by the same line 293 of said secondary valve unit 290, there will be a time delay between the respective actuation of these plungers in that plunger 296 will receive an actuating impulse directly from line 293 through line 295 whereas plunger MB is actuated only after the pressure impulse in line 293 has been functionally transferred through the blocking valve 292, line 297, secondary valve 298 and line 299. It is apparent that this time delay is necessary in that the motor bar key of the adding machine should not be depressed until after the item price amount has been set up on the amount keys of the adding machine. The motor bar plunger MB will be actuated through the common line 297 upon the operation of any one of the other secondary valve units which are similar to 290 and which respectively correspond to the various other digits of the units order.

To trace a given impulse initiated by the operation of one of said counters 15 or 24 through the various circuits just described let it be assumed that the particular item price associated with the counter 15 shown in FIG. 17 of the circuit diagram is 9 cents. When the impulse valve 198 is actuated by depression of counter button 16 the secondary valve 201 will initiate a sub-atmospheric pressure impulse in line 203 to thereby open all the associated normally closed blocking valves 206–215 of the pricing valve unit 58 so that these blocking valves may pneumatically sense the presence of any holes which have been punched in the tape 185. Tape 185 covering all of the inlet ports 217 to said lines 216 will have been punched so that the inlet lines 216 to the units order blocking valves 212 and 213 are open as shown in FIG 17. This will set up the coded value for the assumed item price of 9 cents (note Table B). Thus when all of said blocking valves 206–215 have been opened as above described an atmospheric pressure impulse will be initiated only in the normally evacuated lines 222 and 223. These impulses will actuate the primary-secondary valve units 226 and 227 respectively of said valve assembly 60, FIGS. 17 and 18.

It will be recalled that a sub-atmospheric pressure normally exists in all the odd numbered output lines 235, 261, 263, and 265 of valve units 229, 228, 227, and 226 respectively whereby all the odd numbered blocking valves of the decoding valve assembly 62 are normally maintained in the open condition; and conversely that an atmospheric pressure normally exists in all the even numbered output lines 236, 260, 262, and 264 whereby all the even numbered blocking valves of the decoding assembly are normally maintained in the closed condition. When the "flip-flop" valve units 226 and 227 are actuated through said lines 222 and 223 as in the instant example, the pressure conditions in the respective output lines 264, 265 and 262, 263 of said two valve units; and thus the operative conditions of all the associated blocking valves 264, 265, 262 and 263 are reversed and as a result the only complete pressure conducting passage through the decoding valve assembly 62 will be through lines 270, 283, 284, 285 and 272. As noted above the output line 272 corresponds to a value of nine in the units order of an item price. An atmospheric pressure impulse may then passs through said passage and line 272 to thereby actuate the secondary valve unit 290 which in turn will cause a sub-atmospheric pressure impulse to be transmitted through line 295 which will cause plunger 296 to depress the "nine" key in the units order of the adding machine 26. The said sub-atmospheric pressure impulse in line 293 will also open the blocking valve 292 whereby an atmospheric pressure impulse is transmitted through line 297 to actuate the secondary valve 298. Operation of said valve 298 will cause the plunger MB to depress the motor bar of the adding machine 26 after said "nine" key has been depressed.

In this manner depression of the button 16 of the said counter 15 will, in the assumed case, cause an amount of 9 cents to be entered into the adding machine 26 and will also cause the dial or dials of said counter 15 to be advanced to the next higher number.

Figure 20:
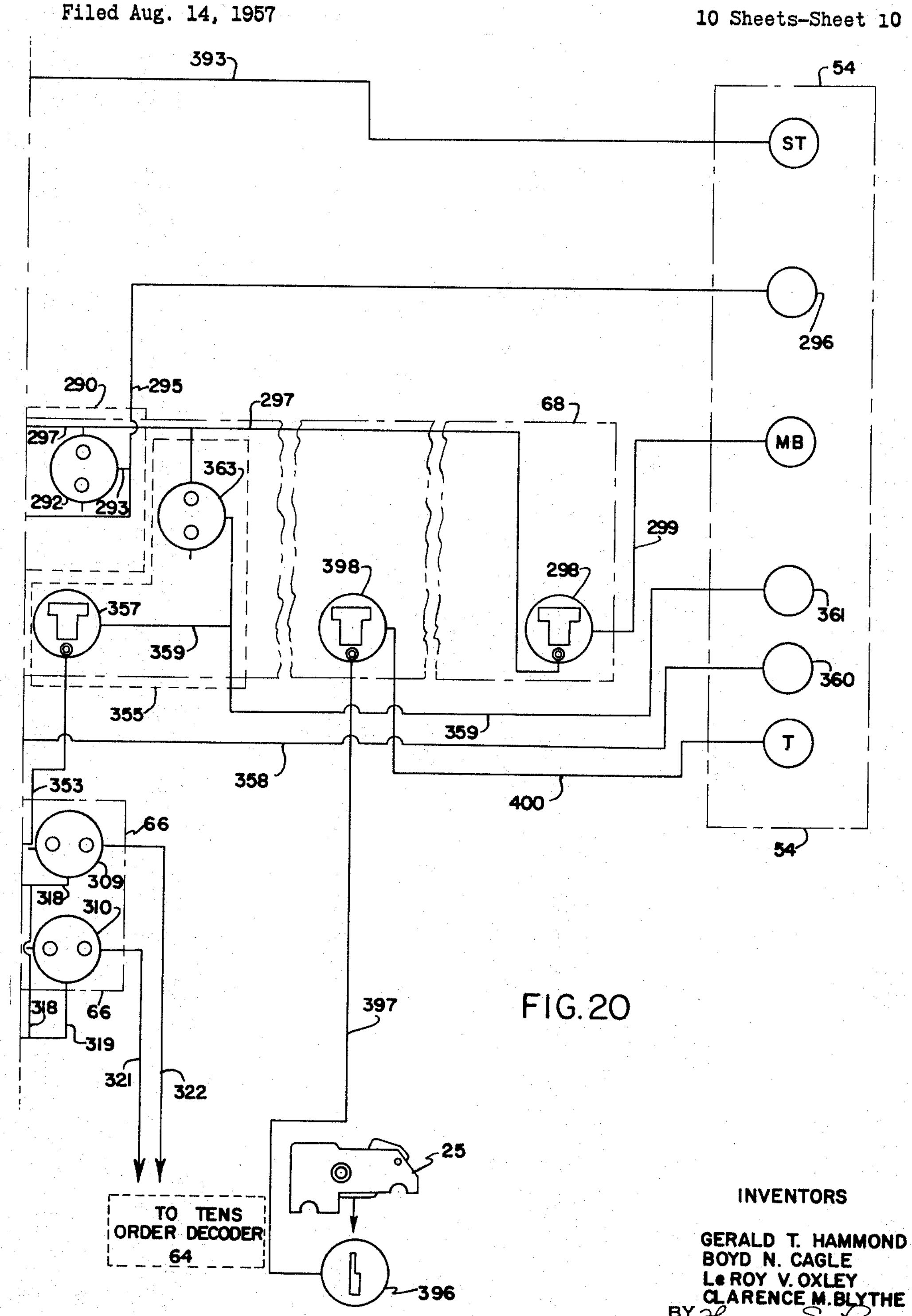

If the assumed item price had had a tens digit, the tape 185 would have been punched so as to open one or more of the inlet ports for the tens order blocking valves 208–211 of the pricing valve assembly 58 whereby a coded pressure impulse or impulses would have been functionally transferred through the primary-secondary valve assesmbly 64, FIGS. 2 and 20, and the secondary valve assembly 68 to the actuator block assembly 54 in a manner similar to that just described for a units order digit.

Many conventional types of adding machines are constructed so that the machine will repeat "cycle" as long as the motor bar is held in the depressed position. In order to prevent the motor bar actuating plunger MB, FIG. 20, from holding the motor bar key of the instant adding machine 26 in the depressed condition for a period longer than that required to cause a single cycling of the machine, an interlock valve assembly 66, FIGS. 4, 19 and 20, is provided. This interlock will function so as to allow the adding machine 26 to partake of only one cycle regardless of how long the operator holds any one of the various counter buttons 16 in the depressed position.

Interlock 66 comprises eight blocking valves 303–310, two of which, 303 and 304, control the passage of air through the two units decoder input lines 269 and 270 respectively. Similarly another pair of blocking valves 309 and 310 control the passage of air through the inlet lines 321 and 322, FIG. 20, of the tens order decoding valve assembly 64, FIG. 4. It will be apparent that when the normally open blocking valves 303, 304 are closed no pressure impulses can be transmitted through lines 269 and 270 and the decoder valve assembly 62, hence under these conditions none of the related valve units 290 etc. of the secondary valve unit 68 and the associated plungers 296, MB etc. of the block assembly 54 can be actuated. Thus the operation of the decoding valve assembly 62 may be interrupted by closing said blocking valves 303 and 304. The means for controlling the operation of the said two blocking valves 303 and 304 comprises a common control line 311 which is operatively connected to said valves 303 and 304 through lines 312 and 313 respectively.

The pressure conditions in line 311 will be controlled by the primary valve 315, FIG. 17, of the primary-secondary valve unit 60. The operation of said valve 315 is controlled through a common line 316 which is connected to the flow line of each of the blocking valves of said primary-secondary unit 226–229, 330, 331 etc. which correspond to said blocking valve 240 of the valve unit 229. It will be apparent that when any one or more of the valve units 226–229 of the primary-secondary valve assembly 60 are actuated the primary valve 315 will be operated and will thereby initiate an atmospheric pressure impulse in line 311 which will close the said two blocking valves 303 and 304 of the interlock valve assembly 66 thus preventing continued operation of the units order decoding valve assembly 62 by closing the decorder inlet lines 269 and 270. A restricted bleeder passage 317 is interposed in said control line 311 so that there is a slight time delay between the operation of the decoding assembly 62 and the interlock valve assembly 66 whereby the decoding assembly 62 is allowed to momentarily transmit a pressure impulse from lines 269, 270 to the secondary valve units 290 etc. and the motor bar control valve 298 of the secondary valve assembly 68 before the operation of said decoding assembly 62 is interrupted by the closing of said blocking valves 303 and 304 of said interlock valve assembly 66. In this manner the motor bar plunger MB of the actuator block assembly 54 can hold the motor bar key of the adding machine 26 in the depressed position only long enough to allow said machine to make one cycle. Thus the adding machine will be cycled only once regardless of how long any one of the various counter buttons 16 is held in the depressed position.

The common control line 311 is also connected through lines 318 and 319 to the blocking valves 309 and 310 respectively of the interlock valve assembly 66 which in turn control the duration of operation of the tens order decoding valve assembly 64 in a manner similar to that just described for the two units order interlock blocking valves 303 and 304.

It will be recalled that the two upper blocking valves 207 and 206 of the pricing valve assembly 58, FIG. 17, represent a value of one or two respectively in the dollars order of an item price. The lines 328 and 329 from said valves 206 and 207 are respectively connected to the two valve units 330 and 331 of the primary-secondary valve assembly 60. These two valve units are similar to the other primary-secondary valve units 226–229 etc. of the valve assembly 60 except that the respective output lines from the two primary valves 332 and 333 thereof corresponding to said lines 235, 261, 263, and 265 of valve units 226–229 have been eliminated in that the respective pressure impulses initiated by the operation of blocking valves 206 and 207 are not coded and hence do not require decoding. The respective output lines 334 and 335 from said value units 330 and 331 are respectively connected so as to control the operation of the blocking valves 308 and 306 of the interlock valve assembly 66. Said blocking valves 306 and 308 are respectively connected through lines 350, 351; blocking valves 305 and 307; and lines 352 and 353 to the two secondary valve units 354 and 355 of the secondary valve assembly 68, respectively. Said valve units 354, 355 are similar in arrangement and operation to the other above described units 290 etc. of said valve assembly 68 and have their secondary valves 356 and 357 respectively connected by means of lines 358 and 359 so as to control the operation of plungers 360 and 361 of actuator block assembly 54. When actuated, said plungers 360 and 361 will respectively depress the 1 and 2 "dollar" keys of the adding machine 26. The respective blocking valves 362 and 363 of said valve units 354 and 355 are functionally interconnected to said motor bar plunger MB through the common line 297, secondary valve 298 and line 299 in a manner similar to that described above for said secondary valve unit 290 of said assembly 68.

It will be noted that the time delay control line 311 for the interlock 66 is connected so as to control said blocking valves 305 and 307 through lines 312, 370 and 318, 371 respectively; thus the pressure impulses from the valve units 330 and 331, FIG. 19, of valve assembly 60 acting through lines 334, 335 are allowed to pass only momentarily through the interlock valve assembly 66 before said valves 305 and 307 of said assembly 66 are closed. Hence again it will be impossible for the adding machine 26 to be cycled more than once when the item price represented by an actuated counter 15 includes a digit of one or two in the dollars order.

When it is desired to take a subtotal of the recorded prices of a group of items, counter 23, FIGS. 1, 2 and 17, is actuated to thereby open the impulse valve 390 which is connected by line 391 so as to control the secondary valve 392 of the primary-secondary valve assembly 60. Operation of said valve 392 will cause a sub-atmospheric pressure impulse to be transmitted through the line 393 to thereby actuate the plunger ST of the said actuator block assembly 54, FIG. 20. Operation of plunger ST will serve to depress the sub-total key of the adding machine 26. In similar fashion when it is desired to take a total of the above noted subtotal amount and a tax amount which has been entered into the machine by actuation of one of said tax amount counters 24, the total counters 25, FIGS. 2 and 20, is actuated to operate the impulse valve 396. An atmospheric pressure impulse will then be transmitted through line 397 to the secondary valve 398 of the secondary valve assembly 68. Operation of said valve 398 will cause a sub-atmospheric pressure impulse to be transmitted through the line 400 to thereby actuate the plunger T of the actuator block assembly 54. Operation of plunger T will serve to depress the total key of the adding machine 26.

From the above description it will be seen that as the operator of the instant machine selectively and serially depresses the buttons of the various item counters 15, FIG. 1, the respective prices represented by said counters will be automatically entered into the adding machine 26. At the same time the counting dials of these counters will each be advanced to the next higher number to thereby maintain a count of the total number of each item which is sold. After so recording the sale of a particular group of items selected by a customer, said operator will actuate the subtotal counter, FIG. 2, to thereby cause said adding machine to print a subtotal. The operator may then compute the proper tax to be applied to this amount and enter the same into the adding machine by actuating the proper tax counter 24, FIG. 2, thereafter the total counter 25, FIG. 2, may be actuated to thereby cause the adding machine to print a total of the above mentioned subtotal and tax amounts. Said portion 27 of the record tape may be torn off and given to the customer who will then present the same together with the proper amount of money to a cashier. It will be seen that utilization of the instant machine will enable one employee to rapidly and efficiently carry out all the billing and inventory operations normally required in a self-service business establishment.

While there is in this application specifically described one form which the invention may assume in practice, it will be understood that this form of the same is shown for purposes of illustration only and that the invention may be modified and embodied in various other forms without departing from its spirit and scope of the appended claims.

The invention claimed is:

1. Pneumatic means for operating a business machine; comprising, a plurality of selectively operable item counters, a plurality of individual actuating means for respectively operating said counters, a plurality of impulse valve units each respectively operated by one of said individual actuating means, means for pneumatically coding each of the impulses respectively initiated by said impulse valve units, a first valve means controlled by said coding means, a decoding valve means controlled by said first valve means, a second valve means controlled by said decoding means, and actuator means controlled by said second valve means for operating the control elements of said business machine.

2. Pneumatic means for operating a key controlled business machine; comprising, a plurality of individually operable impulse valves, a plurality of groups of coding valves, each of said valve groups being respectively controlled by one of said impulse valves, means for selectively enabling and disabling the flow of air through each of said coding valves in accordance with a desired code whereby each of said valve groups may initiate a plurality of coded pressure impulses upon operation of an impulse valve, means for decoding said pressure impulses, and actuator means controlled by said decoding means for operating the keys of said business machine.

3. Pneumatic apparatus for operating a key controlled business machine; comprising, a plurality of individually operable counters, a plurality of impulse valves each respectively operated with one of said counters, a plurality of groups of coding valves, each of said groups being respectively controlled by one of said impulse valves, means for enabling and disabling the flow of air through each of said coding valves in each of said groups in accordance with a predetermined code whereby each of said valve groups may initiate a plurality of coded pneumatic pressure impulses upon operation of an impulse valve, means for decoding said pressure impulses, and means controlled by said decoding means for selectively operating the keys of said business machine.

4. Pneumatic apparatus for operating a business machine; comprising, a plurality of individually operable impulse valves, means controlled by said impulse valves for initiating a plurality of coded pressure impulses, a plurality of "flip-flop" pneumatic valves units controlled by said coded impulse initiating means, a decoding valve means controlled by said valve units and adapted to initiate a single pressure impulse in response to the actuation of at least one of said valve units, and actuator means controlled by said single impulse for operating the control elements of said business machine.

5. Pneumatic apparatus for operating a key controlled business machine; comprising, a plurality of valve means each capable of initiating a plurality of coded pressure impulses, a plurality of "flip-flop" pneumatic valves units respectively controlled by said impulses, a decoding valve means controlled by said valve units for initiating a single pressure impulse in response to the operation of at least one of said valve units, and actuating means controlled by said decoding valve means for selectively depressing the keys of said business machine.

6. Pneumatic apparatus for operating a key controlled business machine; comprising, a plurality of valve means each capable of initiating a pressure impulse, a perforated record enabling and disabling the flow of air through each of said valve means thereby permitting selected coded combinations of pressure impulses to be initiated by said valve means, means for initiating a single pressure impulse in response to the actuation of selected ones of said valve means, a plurality of control valves respectively selectively operated by said single pressure impulses, and means controlled by said control valves for selectively and sequentially depressing the keys of said business machine.

7. Pneumatic apparatus for operating an adding machine having a plurality of amount keys and a motor bar key; comprising, a main frame, an actuator block secured to said frame, a plurality of pneumatically operated members movably mounted in said block and adapted to respectively engage and depress said keys, pneumatic control means for selectively actuating at least one of said members to thereby depress at least one of said amount keys, means responsive to the operation of said pneumatic control means for actuating the member associated with said motor bar key, and a time delay means for insuring that said members associated with said amount keys are actuated before the actuation of said member associated with said motor bar key.

8. Apparatus as defined by claim 7; additionally comprising, an interlocking means controlled by said pneumatic control means for limiting the duration of time that the member associated with said motor bar key is maintained in the actuated condition.

9. Pneumatic apparatus for operating a key controlled business machine; comprising a main frame, an actuator block secured to said frame, a plurality of pneumatically operated members movably mounted in said block and adapted to respectively engage and depress the keys of said machine, a plurality of individually operable impulse valves secured to said frame, means controlled by said impulse valves for initiating a plurality of coded pressure impulses, a decoding means having a plurality of valves functionally arranged in series and parallel relation and adapted to initiate a single pressure impulse in response to the actuation of said coded pressure impulse initiating means, and means controlled by said decoding means for selectively actuating said members, and an interlocking means controlled by said coded impulse initiating means for limiting the time duration of said single pressure impulse.

10. Pneumatic apparatus for operating an adding machine having a plurality of amount keys and a motor bar key; comprising, a main frame, an actuator block secured to said frame, a plurality of pneumatically operated plungers slidably mounted in said block, one of said plungers being adapted to engage and depress said motor bar key and other of said plungers being adapted to engage and depress the amount keys of said machine; a plurality of individually operated impulse valves mounted on said frame, a plurality of groups of coding valve means each capable of initiating a plurality of coded pressure impulses in response to the respective operation of one of said impulse valves, decoding valve means for initiating a single pressure impulse in response to the operation of said coding valve means, operating means controlled by said decoding valve means for selectively actuating said plungers associated with said amount keys, means controlled by said operating means for actuating said plunger associated with said motor bar, and a time delay means opertively interposed in the last mentioned means.

11. Pneumatic apparatus for operating an adding machine having a plurality of amount keys and a motor bar key; comprising, a main frame, an actuator block secured to said frame, a plurality of pneumatically operated plungers slidably mounted in said block, some of said plungers each being adapted to respectively engage and depress one of said amount keys and at least one of said plungers being adapted to engage and depress said motor bar key, a plurality of counters mounted on said frame, a plurality of impulse valves supported by said frame and adapted to be respectively operated in response to the actuation of said counters, a plurality of groups of coding valves controlled by said impulse valves for initiating a plurality of coded pressure impulses, means for enabling and disabling the flow of air through each of said coding valves, a primary-secondary valve assembly controlled by said coding valves for selectively initiating a plurality of pairs of pressure impulses which respectively correspond to said coded impulses, a decoding valve assembly controlled by said primary-secondary valve assembly for initiating a single impulse in response to the coded impulses received from said primary-secondary valve assembly, a secondary valve means controlled by said decoding valve assembly for operating said plungers associated with said amount keys, and actuator means controlled by said secondary valve means for actuating said plunger associated with said motor bar key at a time subsequent to the operation of the plungers associated with said amount keys.

12. Pneumatic apparatus for operating a business machine that has a plurality of amount keys and a motor bar; comprising a plurality of individually operable impulse valve means, means controlled by each of said valve means for initiating a plurality of coded pressure impulses, valve means for decoding said impulses, and means controlled by the operation of said decoding valve means for operating selected ones of said keys and said motor bar, there being a predetermined time delay between the operation of said keys and the operation of said motor bar.

13. Apparatus for operating a key controlled business machine; comprising a plurality of selectively operable item counters, means operated in response to the operation of each of said counters for initiating a plurality of coded impulses, said means including a plurality of individual impulse initiating means and a perforated record for enabling and disabling the operation of each of said individual impulse initiating means, means for decoding said impulses, actuator means for operating the keys of said business machine, and means controlled by said decoding means for selectively operating said actuator means.

14. Apparatus for operating a business machine that has a plurality of depressible amount keys and a motor bar; comprising a plurality of individually operable counting means, a group of individually operable impulse initiating means operably conditionable simultaneous with the operation of a related one of said counting means, a perforated record for determining which ones of said impulse initiating means are operable to initiate impulses whereby selected coded combinations of impulses may be initiated by said group of individually operable means, means for decoding said coded impulses, actuator means selectively operable to depress the keys and motor bar of said business machine, and means operated in response to the operation of said decoding means for selectively and sequentially operating said actuator means.

15. Apparatus as defined by claim 14; additionally comprising means for causing a time delay between the operation of the actuator means for said amount keys and said motor bar respectively.

16. Apparatus as defined by claim 15; additionally comprising means limiting the duration of each operation of the actuator means for said motor bar.

17. Apparatus for operating a business machine; comprising, a plurality of individually operable item counters, a plurality of impulse valves adapted to be operated during the respective operation of said item counters, a plurality of groups of coding valves, each group being controlled by one of said impulse valves and being operable to initiate a predetermined plurality of coded impulses upon operation of the related one of said impulse valves, means controlled by each group of said coding valves for initiating at least one output impulse corresponding to a digit to be entered on said business machine, and means controlled by the last mentioned means for operating the control elements of said business machine.

18. Apparatus for operating a business machine that has a plurality of depressible amount keys and a motor bar; comprising a plurality of individually operable counting means, means operable with each of said counting means for initiating a group of coded impulses, means for decoding said impulses, a plurality of actuator means selectively operable to depress the keys and motor bar of said business machine, means operated in response to the operation of said decoding means for selectively and sequentially operating said actuator means, and means for limiting the duration of each operation of that actuator means which depresses the motor bar of said business machine.

19. Apparatus for operating a business machine; comprising a group of individually operable impulse initiating means, a single control means for conditioning all of said impulse initiating means for operation, a perforated record for determining which of the various individually operable means in said group are to initiate impulses thereby permitting said group of individually operable means to initiate a plurality of selected coded impulses, decoding means controlled by said coded impulses for initiating a single output impulse upon operation of said control means, a plurality of actuator elements for operating the keys of said business machine, and means controlled by said output signal for selectively actuating said actuator elements.

20. Apparatus for operating a business machine having a plurality of selectively depressible amount keys and a motor bar; comprising a plurality of individually operable control keys, encoding means operated in response to the depression of said control keys for initiating different groups of coded impulses corresponding to the respective control keys depressed, decoding means for decoding the various groups of said coded impulses, a plurality of individually operable actuators for respectively individually depressing said amount keys and motor bar, circuit means interconnecting said decoding means and said actuators so that each time said decoding means are operated predetermined ones of said amount keys and said motor bar are operated, and means for delaying the operation of the actuator for depressing said motor bar until after the depression of said predetermined ones of said amount keys.

21. Apparatus as defined by claim 20 wherein separate encoding and associated decoding means are provided for each order digit of each amount to be set up in the keyboard of said business machine.

22. Apparatus for operating a business machine having a depressible motor bar and a plurality of selectively depressible amount keys arranged in order columns; comprising a plurality of individually operable control keys, separate encoding means for each of a plurality of amounts to be entered into said business machine and each of said encoding means including a separate encoder for initiating a group of coded impulses for each order digit of the related amount to be entered into said business machine, said encoding means being operable under the selective control of said control keys, decoding means controlled by said encoding means, said decoding means including a separate order decoder connected to decode each of said groups of coded impulses and each initiating a single impulse representative of the associated order digit of said amount to be entered into said business machine, a plurality of actuators for depressing said motor bar and amount keys, and circuit means connected to said decoding means for controlling the operation of said actuators.

23. Apparatus as defined by claim 22 wherein the separate encoder for the various orders of amounts to be entered into said business machine are capable of being selectively varied so as to change the coding for any given group of impulses initiated by the actuation of any one of said control keys.

24. Apparatus as defined by claim 23 wherein said encoding means include a perforatable record and wherein means are additionally provided for delaying the operation of the actuator associated with said motor bar until the selected amount keys have been depressed by operation of their respectively associated actuators.

25. Pneumatic apparatus for operating a business machine having a motor bar and a keyboard of selectively depressible amount keys arranged in order columns, a plurality of individually operable control keys, pneumatic encoding means operated in response to the depression of each of said control keys for initiating coded groups of pressure impulses for each order digit of the amount which is represented by the associated depressed control key and which is to be set up in the keyboard of said business machine, pneumatic decoding means controlled by said encoding means for initiating a single pressure impulse for each of said coded groups of pressure impulses representative of the related order digit of said amount, a plurality of individually operable pneumatic actuators for respectively individually depressing the amount keys and motor bar of said business machine, circuit means operatively connecting said decoding means with said actuators so that the said individual impulses respectively control the operation of the actuators associated with the related order keys of said business machine, and means for delaying the operation of the actuator associated with said motor bar until after the selected amount keys have been depressed by their respectively associated actuators.

References Cited in the file of this patent

UNITED STATES PATENTS

| | | |
|---|---|---|
| 1,361,791 | Carroll et al. | Dec. 7, 1920 |
| 1,383,757 | Reynolds | July 5, 1921 |

| | | |
|---|---|---|
| 1,460,917 | Penaflor | July 3, 1923 |
| 1,936,416 | Turnbull | Nov. 21, 1933 |
| 2,014,432 | Gerhold | Sept. 7, 1935 |
| 2,181,166 | Austin | Nov. 28, 1939 |
| 2,469,754 | Tierny | May 10, 1949 |
| 2,656,105 | Terrill | Oct. 20, 1953 |